United States Patent [19]

Fischer et al.

[11] Patent Number: 5,301,749
[45] Date of Patent: Apr. 12, 1994

[54] DUAL PUMP FLOATING LAYER RECOVERY APPARATUS

[75] Inventors: David A. Fischer, Ann Arbor; Kevin L. Newcomer, Monroe, both of Mich.

[73] Assignee: QED Environmental Systems, Inc., Ann Arbor, Mich.

[21] Appl. No.: 945,513

[22] Filed: Sep. 16, 1992

[51] Int. Cl.⁵ .................. E21B 43/12; E21B 43/34; F04F 1/08
[52] U.S. Cl. .................. 166/54; 166/54.1; 166/72; 417/118; 417/138
[58] Field of Search .................. 166/53, 64, 68, 370, 166/66, 54; 417/118, 137, 138, 143

[56] References Cited

U.S. PATENT DOCUMENTS

| | | | |
|---|---|---|---|
| 4,469,170 | 9/1984 | Farmer, Jr. | 166/53 |
| 4,489,779 | 12/1984 | Dickinson et al. | |
| 4,527,633 | 7/1985 | McLaughlin et al. | 166/64 X |
| 4,585,060 | 4/1986 | Bernardin et al. | |
| 4,625,801 | 12/1986 | McLaughlin et al. | 166/64 X |
| 4,625,807 | 12/1986 | Harlow | 166/53 X |
| 4,678,040 | 7/1987 | McLaughlin et al. | 166/64 X |
| 4,727,936 | 3/1988 | Mioduszewski et al. | |
| 4,901,798 | 2/1990 | Amani | 166/53 X |
| 4,934,458 | 6/1990 | Warburton et al. | 166/53 X |
| 4,998,585 | 3/1991 | Newcomer et al. | |
| 5,141,404 | 8/1992 | Newcomer et al. | |

Primary Examiner—Ramon S. Britts
Assistant Examiner—Frank S. Tsay
Attorney, Agent, or Firm—Harness, Dickey & Pierce

[57] ABSTRACT

There is provided a dual pump floating layer recovery apparatus for pumping a floating layer of contaminant out of a well. The apparatus comprises an upper pump and a lower pump. The lower pump creates a cone of depression which increases the amount of the floating layer within the well. The upper pump pumps the contaminant from the well or cone of depression. The upper and lower pumps preferably are gas-actuated pumps. The lower pump preferably includes an automatic switching device to activate the lower pump upon sensing a predetermined amount of fluid within the pump. A gas conduit interconnects the actuation chambers on both pumps such that when the lower automatic pump is provided with pressurized gas, the upper pump is simultaneously provided with the identical pressurized gas. Upon deactivation, both pumps relieve the activation pressure through the lower pump.

15 Claims, 3 Drawing Sheets

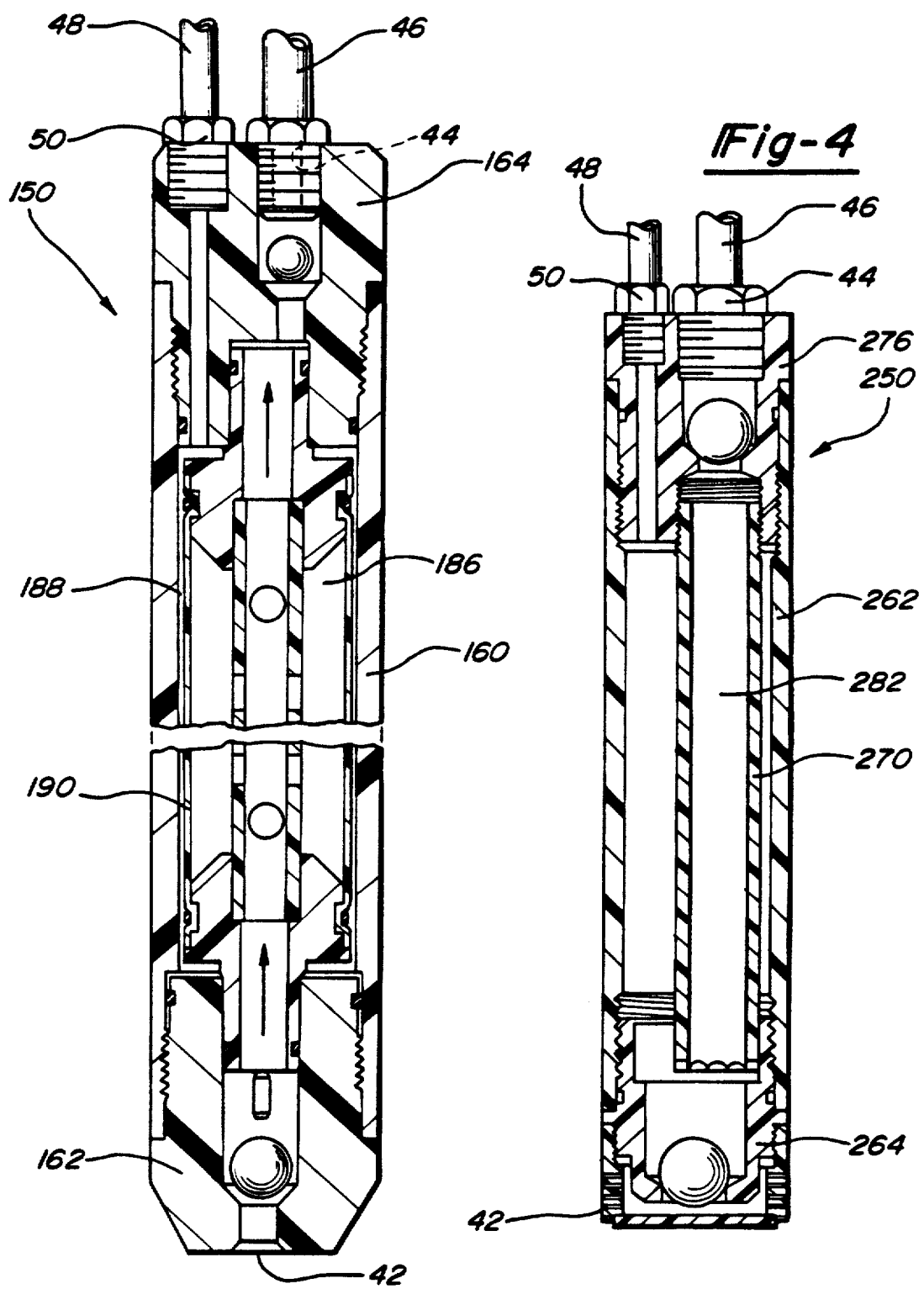

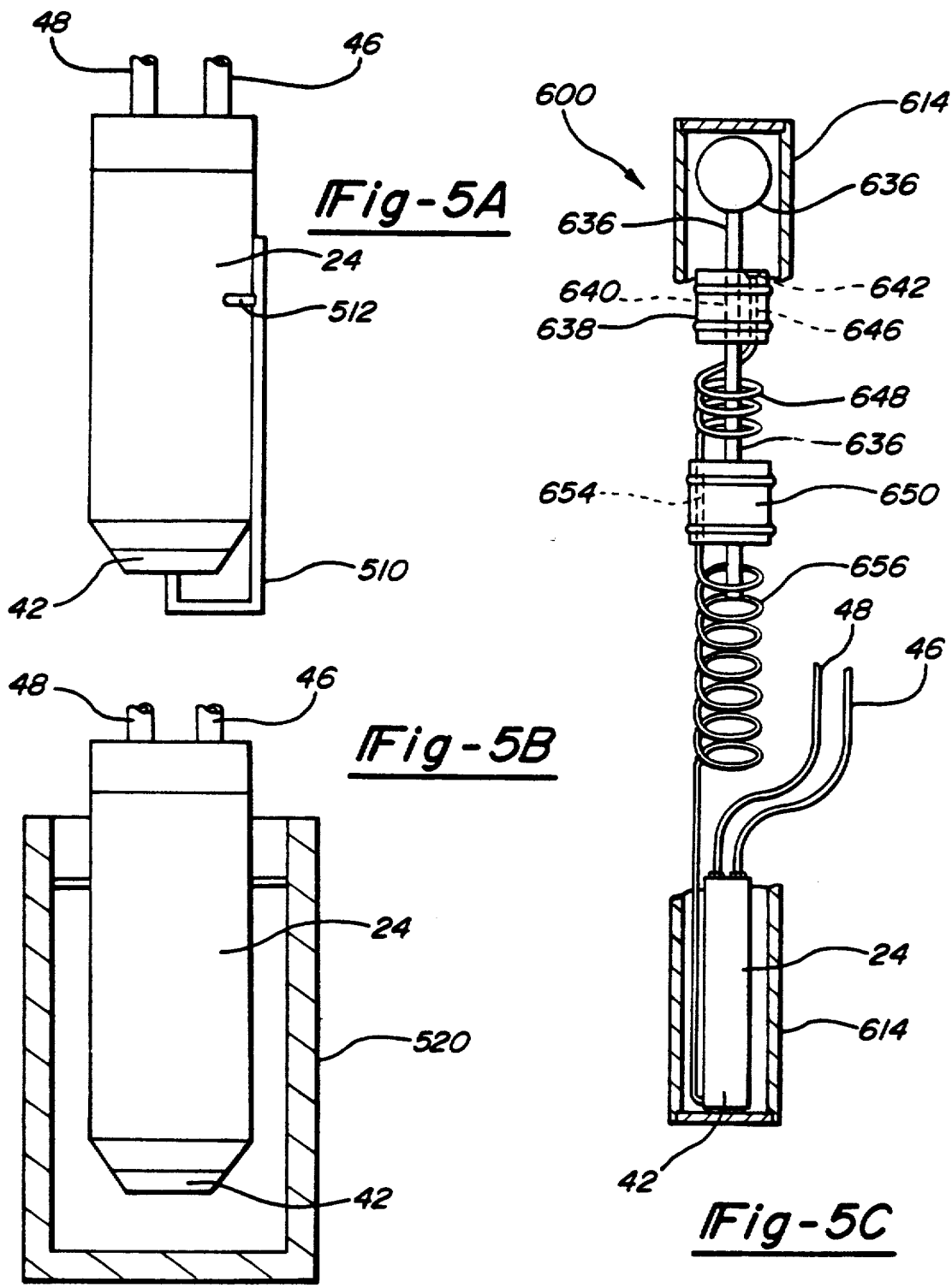

DUAL PUMP FLOATING LAYER RECOVERY APPARATUS

FIELD OF THE INVENTION

The present invention relates to a dual pump fluid pumping apparatus. More particularly, the present invention relates to a dual pump fluid pumping apparatus for pumping an underground floating liquid layer.

BACKGROUND OF THE INVENTION

Recent increases in public concern for the environment have resulted in various government imposed environmental regulations. Among such regulations are requirements relating to the monitoring of groundwater quality. In response to these requirements, water quality analytic capabilities have been improved and water sampling equipment has been developed. Increased monitoring and sampling of groundwater and environmental quality has resulted in a substantial increase in the number of identified sites of contaminated groundwater. Along with the identification of an increased number of contaminated sites has been an increased effort to clean up these sites. This effort at cleaning of contaminated groundwater has lead to a need for improved below ground pumping systems to assist in these clean up efforts.

Once it has been determined that groundwater is contaminated, the clean up effort will often include decontamination of the groundwater by pumping the contaminant from the well. This is feasible where, for example, the contaminant is a floating layer lying above the groundwater. By selectively pumping the contaminant from the groundwater the site may be thereby decontaminated. An added benefit and incentive to pumping groundwater contaminants, such as hydrocarbons, is that the pumped contaminants may be recycled for reuse. Much of the previously developed floating layer equipment has not been effective, however, in permitting the efficient pumping of the floating layer to the exclusion of the groundwater.

It is common to employ what is known as a dual pump system to recover contaminants that are floating on the water within a well. The dual pump system uses a lower pump submerged in the groundwater to create a draw-down in the recovery well by the action of its pumping. This draw-down extends out away from the well and forms what is known as a "cone of depression". The cone of depression defines an area around and away from the recovery well where the natural static water level is lowered, or depressed and the contaminant is induced to flow toward and collect in the recovery well. A second, upper or product pump is then used to pump the contaminant. In this way, the contaminant is collected at a higher rate than by pumping the contaminant alone. In the preferred embodiment, the lower pump removes pure groundwater and the upper pump removes pure contaminant.

Many different types of pumps have been used for both the lower draw-down pump and the upper contaminant pump. For lower recovery wells it is common to use the various types of pneumatic pumps for both functions. When using pneumatic pumps for both the upper and lower pumps, the question of control of the pumps and the coordination of the two pumps working together has always been a costly and complex problem. Whether used for the upper or lower pump, pneumatic pumps are normally under the control of a surface located pneumatic control unit. While the surface located control unit has been used successfully for these types of pumps, there are additional costs and complexity which are added to the cost of the pump itself. When attempting to control two pumps and coordinate the pumping action of both pumps, there is an additional increase in both the cost and complexity of the total system. The cost and complexity can be somewhat reduced by using the pumps which avoid the necessity of external controllers by incorporating sensing means within the pump to detect when fluid has entered the pump to a desired level. Unfortunately, the use of these type of pumps alone does not solve the linking of the two pumps to operate as a total system.

Accordingly, what is needed is a dual pump system which reduces both the cost and complexity of controlling the total pumping system when the two pumps are working together to remove a floating layer of contaminants.

Additional objects, advantages and features of the present invention will become apparent from the following description and appended claims taken in conjunction with the accompanying drawings.

BRIEF DESCRIPTION OF THE DRAWINGS

FIG. 3 is a longitudinal sectional view of part of the system of FIG. 1 with a bladder pump being used for the upper pump.

FIG. 4 is a longitudinal sectional view of part of the system of FIG. 1 with a gas displacement pump being used for the upper pump.

FIGS. 5A-5C are longitudinal sectional views of the upper pump of FIG. 1 incorporating various means for positioning the inlet of the upper pump in the contaminant.

DESCRIPTION OF THE PREFERRED EMBODIMENT

Figures 1, 2:
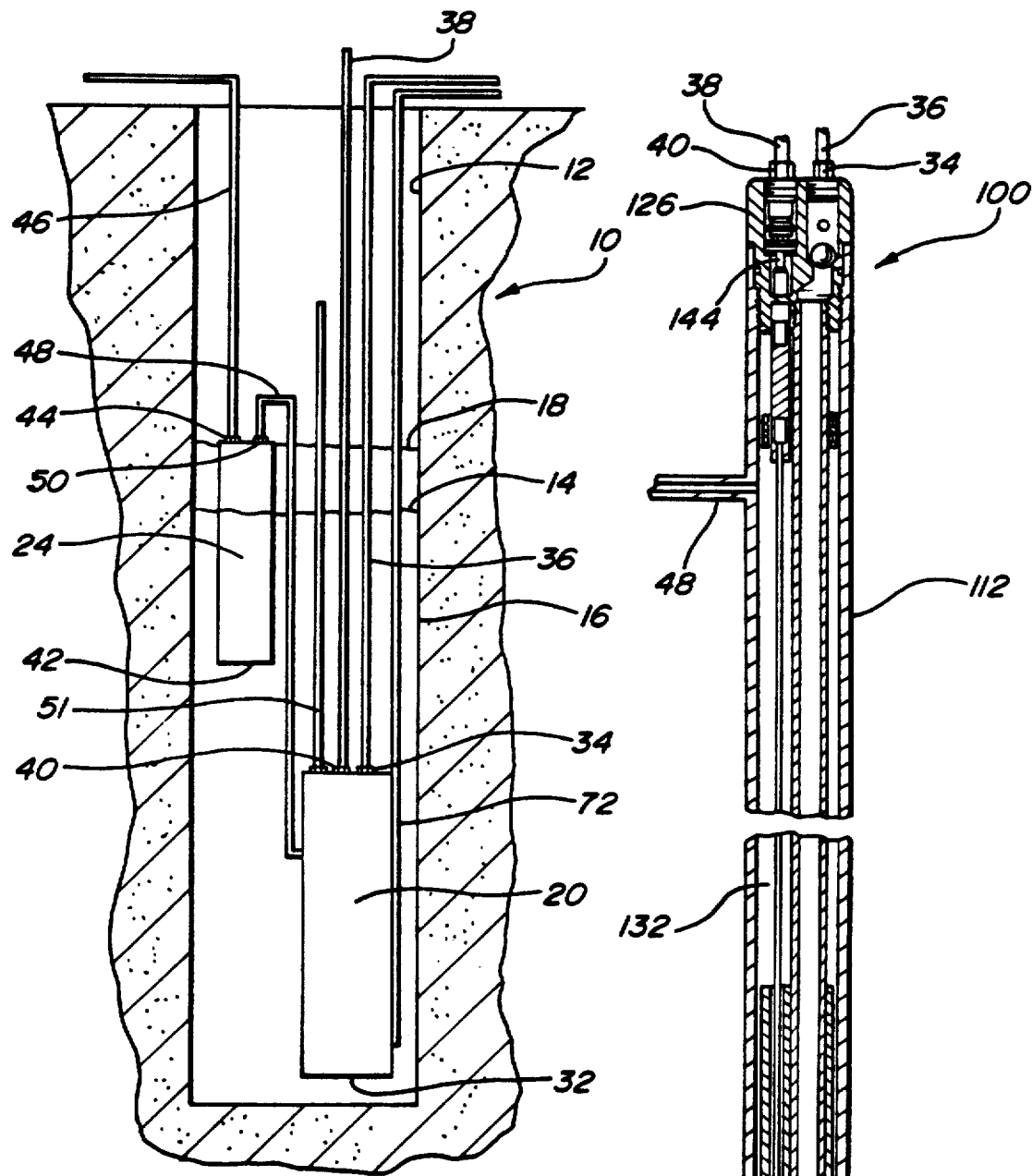
FIG. 1 is a longitudinal sectional view of a fluid sampling system of the present invention.
FIG. 2 is a longitudinal sectional view of part of the system of FIG. 1 with a gas displacement pump having an automatic control being used for the lower pump.

For purposes of illustration, FIGS. 1 through 5C of the drawings depict exemplary embodiments of a dual pump floating layer recovery apparatus according to the present invention as installed in a conventional well. One skilled in the art will readily recognize from the following discussion that the principles of the invention are equally applicable to fluid sampling apparatus other than that shown in the drawings as well as to other fluid pumping apparatus.

In FIG. 1, an exemplary dual pump floating layer recovery apparatus according to the present invention is indicated generally by reference numeral 10 and is shown for purposes of illustration as installed in a conventional well 12 such that the upper surface level of fluid is at approximately the position 18 and the interface between the surface of the groundwater and the bottom surface of the floating layer occurs at approximately the position 14. Conventional well 12 includes a well casing 16. A lower fluid pump 20 is disposed within well casing 16 of conventional well 12 and is submerged beneath surface 14 to a suitable depth for obtaining pure groundwater samples. A conventional bubbler line (not shown) may be employed with a conventional pressure sensing apparatus in the conventional manner to ascertain from the ground level when the desired depth has been reached. An upper fluid pump 24 is also disposed within well casing 16 of conventional well 12 and is submerged beneath the top level 18 of the floating layer such that the input to pump 24 is at a suitable depth for obtaining pure floating layer or contaminant samples.

While the detail description below will describe the upper and lower fluid pumps as being gas actuated pumps, it is within the scope of the present invention to utilize other types of pumps including electrically actuated pumps.

As is explained in further detail below, the preferred fluid pump 20 is an automatic gas-actuated pump, wherein the actuating gas is preferably a gas such as air, for example, and includes an inlet port 32 and an outlet port 34. Fluid pump 20 also includes a groundwater conduit 36 sealingly connected at one end to outlet port 34 and extending to above the ground level to provide direct groundwater delivery to an appropriate container. A gas conduit 38 is sealingly connected at one end to a gas connection 40 on pump 20 and the other end extends to above the ground to a source of compressed gas or a controller apparatus if one is being utilized. The controller apparatus, if used, would then be connected to the source of compressed gas. Because pump 20 is preferably of a lightweight construction, conduits 36 and/or 38 may also be used to retain pump 20 in its submerged position in the well. Depending on the type of pump being used for fluid pump 20, it may be necessary to provide an actuating gas exhaust line 51 to exhaust the actuating gas to a position above the level of fluid 18 in well 12.

As is also explained in further detail below, the preferred fluid pump 24 is a gas actuated pump, wherein the actuating gas is preferably a gas such as air, for example. The actuating gas for fluid pump 24 is to be identical to that of fluid pump 20. Fluid pump 24 includes an inlet port 42 and an outlet port 44. Fluid pump 24 is to be positioned such that the inlet of pump 24 is disposed between surface 14 and surface 18 of the floating layer. Various methods of locating the inlet of pump 24 will be described later herein. Fluid pump 24 also includes a contaminant conduit 46 sealingly connected at one end to outlet port 44 and extending to above the ground level to provide direct contaminant delivery to an appropriate container. A gas conduit 48 is sealingly connected at one end to a gas connection 50 on pump 24 and the other end is sealingly connected to the actuating gas for fluid pump 20 at a position downstream from or after the automatic control device used to actuate fluid pump 20. Gas conduit 48 is connected such that the actuation of fluid pump 20 will simultaneously actuate fluid pump 24. The exact position for connecting gas conduit 48 to fluid pump 20 will be determined by the type of pump being used for fluid pump 20 and will be described later herein.

A static head or measuring fluid conduit 72, as shown in FIG. 1, may be incorporated to control the introduction of pressurized actuating gas to gas conduit 38. Conduit 72 has an open end extending beneath the surface 14 of the groundwater in well 12. An opposite end of conduit 72 is interconnected to a control apparatus (not shown) which supplies air or other control fluid (as a measuring fluid) to conduit 72 at a pressure sufficient to force some measuring fluid to bubble out of the open end of conduit 72 against the static head of the liquid in well 12. The pressure necessary to expel the liquid from the open end of conduit 72, and thus to cause measuring fluid to bubble from the open end of conduit 72, is directly indicative of the static head, and thus the standing level, of the fluid in well 12. The control apparatus and conduit 72 function to cycle pressurized actuating gas to gas conduit 38 in response to predetermined high and low fluid levels in well 12. One control apparatus which has proven to work satisfactorily is described in more detail in U.S. Pat. No. 4,727,936 the disclosure of which is hereby expressly incorporated by reference.

Referring to FIG. 2, fluid pump 20 is shown as a gas displacement pump 100 having an automatic control for cycling pump 100. One pump which has proven to work satisfactorily for pump 100 consists of a pump identified by the registered trademark "SOLO" manufactured by QED Environmental Systems, Inc., of Ann Arbor, Mich. and described in more detail in U.S. Pat. No. 5,141,404 the disclosure of which is hereby expressly incorporated by reference.

Pump 100 includes a hollow outer tube 112 which forms the main body of pump 100. Outer tube 112 is closed at its lower end by a liquid inlet fitting 114 which is inserted into the lower end of outer tube 112 to form a liquid and air tight seal between inlet fitting 114 and outer tube 112. Inlet fitting 114 includes inlet port 32. At the opposite end of outer tube 112 is a pump cap 126 which, like inlet fitting 114, is secured to the end of outer tube 112 to form a liquid and air tight seal with outer tube 112. Pump cap 126 includes outlet port 34 which passes through pump cap 126 to the pump chamber 132 in the interior of outer tube 112. Pump cap 126 also includes gas connection 40 into which is inserted a pneumatic valve 144. Pneumatic valve 144 is operable to supply compressed gas to chamber 132 from gas connection 40 when a predetermined amount of liquid is present in chamber 132. Pneumatic valve 144 is also operable to relieve the pressure in chamber 132 by venting chamber 132 to atmosphere through gas exhaust line 51.

Gas conduit 48 is connected through outer tube 112 to the upper portion of chamber 132. The connection is positioned such that during the operation of pump 100, the fluid level in chamber 132 never reaches the connection point of gas conduit 48. Thus, when valve 144 provides actuating gas to chamber 132 of pump 100, pump 24 is also actuated by the actuating gas being simultaneously provided to gas connection 50 of pump 24 through gas conduit 48.

The above system provides a fully automatic dual pump floating layer recover apparatus without the cost and complexity involved with the use of above ground controllers and connection.

Referring to FIG. 3, fluid pump 24 is shown as a bladder pump 150. One pump which has proven to work satisfactorily for pump 150 consists of a pump identified by the registered trademark "WELL WIZARD" manufactured by QED Environmental Systems, Inc., of Ann Arbor, Mich., and described in more detail in U.S. Pat. No. 4,489,779 and U.S. Pat. No. 4,585,060 both of the disclosures of which are hereby expressly incorporated by reference.

Pump 150 includes a generally hollow cylindrical pump body 160 having an inlet cap 162 and an outlet cap 164. Inlet cap 162 and outlet cap 164 are sealed to pump body 160. Inlet cap 162 includes inlet port 42 and check valve means for preventing backflow of fluid through inlet port 42 from the interior of pump 150. Outlet cap 164 includes outlet port 44, gas connection 50 and a similar check valve means for preventing flow through outlet port 44 from conduit 46. The interior of pump body 160 is divided and isolated into two chambers by a generally cylindrical flexible bladder 190. Bladder 190 defines a fluid chamber 186 in its interior and defines an annular gas chamber 188 between the bladder exterior and the interior wall surface of pump body 160.

Pump 150 is actuated by means of an actuating gas being supplied to gas chamber 188 which is alternately subjected to positive and negative or reduced pressures. The actuating gas is supplied to gas chamber 188 via gas conduit 48 through gas connection 50 which is in communication with gas chamber 188. Gas pressure in gas chamber 188 is relieved or reduced through gas conduit 48 through gas connection 50.

Thus, when pump 20 is actuated by being supplied with an actuating gas, conduit 48 is also supplied with the actuating gas and through gas connection 50 actuates bladder pump 150. Bladder pump 150 will continue to collapse bladder 190 until the pressure in gas conduit 48 is relieved. The timing for bladder pump 190 will be controlled by the control system for pump 20. If bladder pump 150 does not pump a full compliment of contaminant or if bladder 190 is fully collapsed and pressure from gas conduit 48 is still supplied, there is no detrimental effect to bladder pump 150. The above system when used in conjunction with the pump disclosed in FIG. 2 or any other automatic lower fluid pump, provides a fully automatic dual pump recovery apparatus without the cost or complexity involved with the use of above ground controllers for either pump 20 or pump 24.

Referring now to FIG. 4, a gas displacement pump 250 is shown as upper pump 24. One pump which has proven to work satisfactorily for pump 250 consists of a pump described in more detail in U.S. Pat. No. 4,727,936 the disclosure of which is hereby incorporated by reference.

Pump 250 is an air-operated gas-displacement pump including a generally hollow cylindrical pump body 262. Pump body 262 is closed at its lower end by a liquid inlet fitting 264 which is inserted into the lower end of pump body 262 to form a liquid and air seal between inlet fitting 264 and pump body 262. Inlet fitting 264 includes inlet port 42. At the opposite end of pump body 262 is a pump cap 276 which, like inlet fitting 264, is secured to the end of pump body 262 to form a liquid and air tight seal with outer tube 262. Pump cap 276 includes outlet port 44 which passes through pump cap 276 to the pump chamber 282 in the interior of pump body 262. Pump cap 276 also includes gas connection 50 which is also in communication with pump chamber 282. A discharge tube 270 is provided within pump chamber 282 and is in communication with outlet port 44 and fluid conduit 46.

Pump 250 is actuated by means of an actuating gas sequentially and pulsatingly being supplied to pump chamber 282 through gas connection 50 via gas conduit 48. The actuating gas forcibly discharges and displaces the liquid present in pump chamber 282 through discharge 270, through outlet port 44 and through fluid conduit 46. Between pressure pulses, the pressure of air or other gas in pump chamber 282 is relieved or depressurized in order to permit contaminant to flow under the influence of its own static head through inlet port 42 of inlet fitting 264.

Gas conduit 48 is connected via gas connection 50 to pump chamber 282. Thus when lower pump 20 is activated, actuating gas is supplied to pump chamber 282 through gas conduit 48. Pump 250 will continue to pump contaminant until the pressure being supplied through gas conduit 48 is removed or relieved. The above system when used in conjunction with the pump disclosed in FIG. 2 or any other automatic fluid pump, provides a fully automatic dual pump recovery apparatus without the cost and complexity involved with the use of above ground controllers for either pump 20 or pump 24.

FIGS. 5A through 5C show various ways of insuring that inlet port 42 is always in communication with pure contaminant. FIG. 5A shows a tube 510 sealingly connected to inlet port 42 and positioned such that tube 510 extends upward along the side of pump 24. A retention clip 512 can be attached to tube 510 and pump 24 to secure tube 510 if required. The upper end of tube 510 can then be positioned within the contaminant to provide pure contaminant to inlet port 42. Once positioned, the contaminant will enter inlet port 42 by virtue of its standing head.

FIG. 5B shows a cylindrical can 520 having a closed bottom and open top surrounding pump 24. Can 520 should be secured to pump 24 in order to maintain their relative position. When pump 24 and can 520 are submerged in well 12, can 520 should be positioned at a depth where the top of can 520 will be located within the contaminant layer. In this way, the contaminant will flow into can 520 and enter inlet port 42 by virtue of its standing head.

FIG. 5C shows the interior components of a floating layer recovery apparatus 600 which are contained in a housing 614. One apparatus which has proven to work satisfactorily for apparatus 600 consists of an apparatus identified by the registered trademark "SEEKER" manufactured by QED Environmental Systems, Inc., of Ann Arbor, Mich. and described in more detail in U.S. Pat. No. 4,998,585 the disclosure of which is hereby expressly incorporated by reference.

In general, the interior components in the floating layer recovery apparatus 600 include a top float 634, a stainless steel rod 636, a secondary float 638, bottom float 650 and pump 24. Steel rod 636 is attached to top float 634 and extends vertically downward and through a bore 640 in secondary float 638. Bore 640 is slightly larger in diameter than rod 636 so that secondary float 638 may easily slide up and down rod 636. An inlet port 642 is disposed near the top of secondary float 638. The density of secondary float 638 is selected to achieve an effective buoyancy in the floating layer that is slightly positive but near neutral. Also, secondary float 638 floats in water. Contaminant liquids entering inlet 642 pass into a bore 646 inside secondary float 638 and travel to the bottom of secondary float 638 where the liquids enter a helically coiled conduit 648.

The opposite end of coiled conduit 648 is connected to the top of bottom float 650 which is rigidly attached to rod 636. A vertical bore 654 extends through bottom float 650 from conduit 648 at the top of float 650 to the bottom of float 650 where it is connected to a second discharge conduit 656, similar but longer than conduit 648. Conduit 656 extends to connect to inlet port 42 of pump 24.

In operation, floating layer recovery apparatus 600 is inserted into a well (not shown) such that top float 634 floats in the floating layer, second float 638 is substantially disposed in the floating layer while bottom float 650 is substantially in the groundwater. As the floating layer is pumped, it becomes thinner and top float 634 will lower causing bottom float 650 to also lower. Since secondary float 638 floats in the groundwater, it will also lower but will not permit inlet 642 to sink below interface 14.

The above detailed description has described various pneumatic pumps which have satisfactorily performed in the dual pump apparatus 10, this should in no way limit the types of fluid pumps which could be used for upper pump 24. Other fluid pumps which could be substituted include piston type, diaphragm type or any other type of pneumatic or electric pump.

While the above detailed description describes the preferred embodiments of the present invention, it should be understood that the present invention is susceptible to modification, variation and alteration without deviating from the scope and fair meaning of the subjoined claims.

What is claimed is:

1. An apparatus for recovery of a first liquid floating on a second liquid in a well, said apparatus comprising:

first means for pumping said second liquid, said first pumping means having an inlet disposed within said second liquid; and second means for pumping said first liquid, said second pumping means having an inlet disposed within said first liquid; said second pumping means is constant communication with said first pumping means such that activation of said first pumping means simultaneously activates said second pumping means.

2. The apparatus of claim 1 wherein:

said first pumping means has a chamber for receiving pressurized gas; and said second pumping means has a chamber for receiving pressurized gas, said chamber of said first pumping means being in constant communication with said chamber of said second pumping means through a gas conduit.

3. The apparatus of claim 1 wherein said first pumping means is a gas activated fluid pump.

4. The apparatus of claim 1 further comprising:

well level sensing means for sensing the level of liquid material in said well, said level sensing means including a static head conduit having an open end and extending below the surface of said liquid material in said well and a second end in fluid communication with a source of a first measuring fluid, said level sensing means further including means for supplying said first measuring fluid to said static head conduit at a pressure sufficient to force a portion of said first measuring fluid out of said open end against the static head of said liquid material, and means for measuring and controlling the pressure of said first measuring fluid in order to determine the level of said liquid material in said well; and control means for selectively actuating said first pumping means in response to the sensing of a predetermined high liquid material level in said well and for selectively deactivating said first pumping means in response to the sensing of a predetermined low liquid material level in said well in order to thereby control the level of the liquid material in said well.

5. The apparatus of claim 1 wherein said second pumping means is a gas actuated fluid pump.

6. The apparatus of claim 1 wherein said inlet of said second pumping means comprises:

first float means disposed in said well in said first liquid, said float means having an effective buoyancy such that it floats in said first liquid;

second float means disposed in said well in said first liquid, said float means having an effective buoyancy such that it floats near the bottom of said first liquid, said second float means having top, side and bottom surfaces;

an inlet means disposed on said second float surface for permitting entry of said first liquid;

conduit means coupled to said inlet means and extending below said second float means;

third float means disposed in said second liquid and having an effective buoyancy such that said third float means will remain submerged in said second liquid, said conduit means being coupled to said third float; and guide means for slidably connecting said second float between said first and third float.

7. The apparatus of claim 1 wherein:

said first pumping means is a first gas actuated fluid pump;

said second pumping means is a second gas actuated fluid pump, said second gas actuated fluid pump being in constant communication with said first gas actuated pump such that said second gas actuated pump is simultaneously activated by pressurized gas being supplied to activate said first gas actuated pump.

8. The apparatus of claim 1 wherein said first pumping means comprises:

an outer tube forming an outer chamber therein;

an inner tube forming an inner chamber therein;

inlet means at a first end of said tube for permitting liquids to enter said outer and inner chambers;

a cap at a second end of said tubes, said cap containing a discharge port in communication with the second end of said inner tube;

an air inlet port in said cap for permitting pressurized gas to enter said second end of said outer tube;

a vent port for permitting air in said outer chamber to escape to atmosphere;

a float slidably disposed inside said outer tube, said float being buoyant in said liquid, wherein said float slides from said first end of the outer tube to the second end in response to the level of said liquid in said outer chamber;

a valve disposed in said air inlet port for selectively admitting, in a discharge mode, and blocking, in a refill mode, said source of compressed air into said outer chamber, and for selectively venting in said refill mode and blocking in said discharge mode the outer chamber to said vent port;

actuating means responsive to the position of said float and coupled to said valve for actuating said valve from said refill mode to said discharge mode, wherein said liquid is admitted into said inner and outer chambers during said refill mode and said liquid is forced from said outer chamber through said inner chamber at said discharge port during said discharge mode;

wherein said actuating means comprises an actuator rod in said outer chamber moveable by said float, first and second opposing magnets, said first magnet being attached near one end of said actuation rod, and said second magnet being located within said cap means, isolated from said outer chamber and moveable by said first magnet in response to the motion of said float; and said second magnet communicating with said valve to cause said valve to switch from one of said modes to the other.

9. The apparatus of claim 8 further comprising:

well level sensing means for sensing the level of liquid material in said well, said level sensing means including a static head conduit having an open end and extending below the surface of said liquid material in said well and a second end in fluid communication with a source of a first measuring fluid, said level sensing means further including means for supplying said first measuring fluid to said static head conduit at a pressure sufficient to force a portion of said first measuring fluid out of said open end against the static head of said liquid material, and means for measuring and controlling the pressure of said first measuring fluid in order to determine the level of said liquid material in said well; and control means for selectively actuating said first pumping means in response to the sensing of a predetermined high liquid material level in said well and for selectively deactivating said first pumping means in response to the sensing of a predetermined low liquid material level in said well in order to thereby control the level of the liquid material in said well.

10. The apparatus of claim 8 wherein said second pumping means comprises a pump body portion having a gas chamber, a liquid chamber having said inlet and an outlet, and a flexible bladder for isolating said gas chamber from said liquid chamber, said liquid chamber being in communication with said first liquid in said well through said inlet.

11. The apparatus of claim 10 wherein said inlet of said liquid chamber comprises:

first float means disposed in said well in said first liquid, said float means having an effective buoyancy such that it floats in said first liquid;

second float means disposed in said well in said first liquid, said float means having an effective buoyancy such that it floats near the bottom of said first liquid, said second float means having top, side and bottom surfaces;

an inlet means disposed on said second float surface for permitting entry of said first liquid;

conduit means coupled to said inlet means and extending below said second float means;

third float means disposed in said second liquid and having an effective buoyancy such that said third float means will remain submerged in said second liquid, said conduit means being coupled to said third float; and guide means for slidably connecting said second float between said first and third float.

12. The apparatus of claim 8 wherein said second pumping means is a gas displacement pump comprising a pump body submersible in the in-ground well and having a generally hollow pump body interior, said pump body having liquid inlet means including an inlet check valve for providing substantially one-way fluid communication from the in-ground well into the pump body interior, and outlet means including an outlet check valve for providing substantially one-way fluid communication from the pump body interior to the collection system; a discharge tube disposed within said pump body interior in a spaced relationship therewith and having an open inlet end therein, said discharge tube further having a discharge end in sealed fluid communication with said outlet means; said first control means including gas supply means for selectively providing fluid communication between the gas source and the pump body interior in order to actuate said pump, said gas supply means including means for sequentially and pulsatingly supplying pressurized gas into said pump body interior in order to forcibly displace the liquid material therein outward through said discharge tube and said outlet means and then relieving the pressure of the gas in the pump body interior in order to permit the liquid material to flow into said pump body interior through said inlet means.

13. The apparatus of claim 12 wherein said inlet of said pump body comprises:

first float means disposed in said well in said first liquid, said float means having an effective buoyancy such that it floats in said first liquid;

second float means disposed in said well in said first liquid, said float means having an effective buoyancy such that it floats near the bottom of said first liquid, said second float means having top, side and bottom surfaces;

an inlet means disposed on said second float surface for permitting entry of said first liquid;

conduit means coupled to said inlet means and extending below said second float means;

third float means disposed in said second liquid and having an effective buoyancy such that said third float means will remain submerged in said second liquid, said conduit means being coupled to said third float; and guide means for slidably connecting said second float between said first and third float.

14. An apparatus for recovery of a first liquid floating on a second liquid in a well, said apparatus comprising:

first means for pumping said second liquid, said first pumping means having an inlet disposed within said second liquid;

second means for pumping said first liquid, said second pumping means having an inlet disposed within said first liquid; said second pumping means in constant communication with said first pumping means such that activation of said first pumping means also activates said second pumping means;

well level sensing means for sensing the level of liquid material in said well, said level sensing means including a static head conduit having an open end and extending below the surface of said liquid material in said well and a second end in fluid communication with a source of a first measuring fluid, said level sensing means further including means for supplying said first measuring fluid to said static head conduit at a pressure sufficient to force a portion of said first measuring fluid out of said open end against the static head of said liquid material, and means for measuring and controlling the pressure of said first measuring fluid in order to determine the level of said liquid material in said well; and control means for selectively actuating said first pumping means in response to the sensing of a predetermined high liquid material level in said well and for selectively deactivating said first pumping means in response to the sensing of a predetermined low liquid material level in said well in order to thereby control the level of the liquid material in said well.

15. An apparatus for recovery of a first liquid floating on a second liquid, said apparatus comprising:

first means for pumping said second liquid, said first pumping means having an inlet disposed within said second liquid; and second means for pumping said first liquid, said second pumping means in constant communication with said first pumping means, activation of said second pumping means being dependent upon activation of said first pumping means.

* * * * *